(12) United States Patent
Füssl et al.

(10) Patent No.: US 11,318,605 B2
(45) Date of Patent: May 3, 2022

(54) JOINT BEARING FOR A ROBOT WITH AN ELASTICALLY COMPRESSIBLE PRETENSIONING ELEMENT

(71) Applicant: FRUITCORE ROBOTICS GMBH, Constance (DE)

(72) Inventors: Johannes Füssl, Constance (DE); Manuel Tobias Frey, Constance (DE); Jens Robert Riegger, Constance (DE)

(73) Assignee: FRUITCORE ROBOTICS GMBH, Constance (DE)

( * ) Notice: Subject to any disclaimer, the term of this patent is extended or adjusted under 35 U.S.C. 154(b) by 0 days.

(21) Appl. No.: 17/273,849

(22) PCT Filed: Sep. 6, 2019

(86) PCT No.: PCT/EP2019/073826
§ 371 (c)(1),
(2) Date: Mar. 5, 2021

(87) PCT Pub. No.: WO2020/049152
PCT Pub. Date: Mar. 12, 2020

(65) Prior Publication Data
US 2021/0245363 A1  Aug. 12, 2021

(30) Foreign Application Priority Data
Sep. 7, 2018  (EP) ..................................... 8193108

(51) Int. Cl.
*B25J 9/10* (2006.01)
*B25J 17/00* (2006.01)
(Continued)

(52) U.S. Cl.
CPC ............. *B25J 9/1065* (2013.01); *B25J 9/108* (2013.01); *B25J 17/00* (2013.01); *F16C 11/045* (2013.01); *F16C 17/10* (2013.01); *F16C 2322/59* (2013.01)

(58) Field of Classification Search
CPC .......... B25J 9/1065; B25J 9/108; B25J 17/00; F16C 11/045; F16C 2322/59
(Continued)

(56) References Cited

U.S. PATENT DOCUMENTS

| | | | |
|---|---|---|---|
| 5,187,996 A * | 2/1993 | Torii ........................ | B25J 9/046 414/917 |
| 10,967,503 B2 * | 4/2021 | Riegger ................... | B25J 9/046 |

(Continued)

FOREIGN PATENT DOCUMENTS

| | | |
|---|---|---|
| CN | 106989142 A | 7/2017 |
| JP | H05240244 A | 9/1993 |

(Continued)

OTHER PUBLICATIONS

International Search Report and Written Opinion, dated Oct. 28, 2019, in corresponding International Application No. PCT/EP2019/073826, with machine English translation (14 pages).
(Continued)

*Primary Examiner* — William C Joyce
(74) *Attorney, Agent, or Firm* — Fitch, Even, Tabin & Flannery LLP (57) ABSTRACT

A joint bearing for a robot 1 which comprises a shaft 21 and at least one link element 24, 35, 36, 37, 38, 59, 60 mounted to be rotatable on shaft 21 between two axial bearings 22, 23, 43, 44, 45, 46, 54, 55, 63, 64, 69, where a resiliently compressible preloading element 33, 49, 52, 53, 56, 57, 65, 66 is provided which applies an axial preloading force to the axial bearings. A robot with at least one such joint bearing
(Continued)

as well as a method for assembling a joint bearing for a robot are disclosed herein.

13 Claims, 3 Drawing Sheets

(51) Int. Cl.
 *F16C 11/04* (2006.01)
 *F16C 17/10* (2006.01)
(58) Field of Classification Search
 USPC .................. 384/517, 518, 563, 611; 403/146
 See application file for complete search history.

(56) References Cited

U.S. PATENT DOCUMENTS

| 2002/0161481 | A1* | 10/2002 | Uratani | ................. | B25J 9/1065 |
| | | | | | 700/245 |
| 2020/0262056 | A1 | 8/2020 | Riegger et al. | | |

FOREIGN PATENT DOCUMENTS

| JP | H09136286 A | 5/1997 |
| WO | 2017/118953 A1 | 7/2017 |

OTHER PUBLICATIONS

Extended European Search Report and Written Opinion dated Feb. 26, 2019, in corresponding European Application No. 18193108.0, with machine English translation (14 pages).

International Preliminary Report on Patentability dated Mar. 9, 2021, in corresponding International Application No. PCT/EP2019/073826 (6 pages).

* cited by examiner

JOINT BEARING FOR A ROBOT WITH AN ELASTICALLY COMPRESSIBLE PRETENSIONING ELEMENT

CROSS REFERENCE TO RELATED APPLICATIONS

This patent application is the national phase of PCT/EP2019/073826, filed Sep. 6, 2019, which claims the benefit of European Patent Application No. 18193108.0, filed Sep. 7. 2018.

TECHNICAL FIELD

The present invention relates to a joint bearing for a robot which comprises a shaft and a link element mounted to be rotatable on the shaft between two axial bearings. The invention further relates to a robot with at least one such joint bearing, as well as to a method for assembling a joint bearing for a robot. The joint bearing according to the invention is primarily used in the drive train of a robot.

BACKGROUND

Various kinematics for the design of robots are known in prior art. With serial kinematics, the drives are provided in the respective axes of the robot. However, this has the disadvantage that the moving mass is increased by the weight of these drives.

A gear for an industrial robot is known from CN 106 989 142 A, where an eccentric sleeve is attached on a shaft between a compression spring and a locking ring.

Alternatively, parallel kinematics are known for the design of robots, in which, for example, several drives are provided in a base of the robot, the drive motion of which is directed to the respective robotic arms by way of gears provided separately from the robotic arms. For example, four-bar linkages are used there.

In addition, hybrid kinematics are also known in which, for example, serial basic kinematics is combined with a drive by way of parallel kinematics.

However, hybrid and parallel kinematics require a large number of mounting points, not only on the axes between the robotic arms, but also within the drive chains. This applies in particular if the robot is to provide flexible motions in a large work space, since then finely structured parallel kinematics is advantageously provided.

In order to enable the necessary precision of the motion of the robot, the bearings must be precisely positioned and be substantially free of play.

In respective prior art robots, link elements are mounted on shafts in the radial direction by a radial bearing and in the axial direction between two axial bearings, where axial positioning is effected by a stop and the axial pretension is applied by a clamping element which is precisely adjusted in its position.

Adjusting rings, clamping collars or nuts are used as clamping elements, i.e. elements that can be precisely adjusted in their axial arrangement on the shaft. However, the initial adjustment of the clamping element and the subsequent adjustments during maintenance require a considerable amount of work, since not only the bearing pretension but also the bearing position must be carefully adjusted.

SUMMARY

The invention therefore has the object of providing a joint bearing for a robot that meets the requirements for parallel and hybrid kinematics, is operationally reliable, and yet is not very complex to manufacture and assemble.

The invention provides a joint bearing for a robot which comprises a shaft and at least one link element mounted to be rotatable on the shaft between two axial bearings, where a resiliently compressible pretensioning element is provided according to the invention which applies an axial pretensioning force to the axial bearings.

The resiliently compressible pretensioning element enables play compensation and provides an operationally reliable bearing pretension. In addition, the joint bearing according to the invention is sufficiently precise because the forces acting thereupon are primarily directed in the radial direction. However, forces that arise in the axial direction can be absorbed with sufficient positional accuracy.

The arrangement according to the invention enables precise pretensioning, since a defined pretensioning force is applied in the axial direction by the resilient compression of the pretensioning element. Furthermore, the link element is aligned by the pretensioning element and manufacturing tolerances can be compensated for.

The axial bearings are in particular axial rolling bearings, skew rolling bearings, sliding bearings with a collar made of plastic, metal, composite or sintered material, or thrust washers made of plastic, metal, composite or sintered material.

The link elements mounted to be rotatable are each mounted on the shaft by way of radial bearings. They are in particular radial rolling bearings, skew rolling bearings or sliding bearing bushes with or without a collar made of plastic, metal, composite or sintered material. The sliding bearing bush for the radial bearing can be designed in such a way that it protrudes axially over the link element on one or both sides, and therefore also provides the axial bearing on one or both sides. The bush then forms in particular a thrust washer or a bearing race of the axial bearing.

In particular, several components are arranged axially displaceable on a shaft between non-adjustable stops. The components are one or more link elements mounted to be rotatable, spacer sleeves, axial bearings and/or preloading elements. The stops can be link elements firmly connected to the shaft, changes in diameter in the shaft and/or pure fixation elements such as nuts and/or retaining collars.

The axial bearings can be arranged directly on the link element mounted to be rotatable or are axially spaced apart therefrom if other components are provided between the link element and the axial bearing, such as the pretensioning element or a spacer sleeve.

In one embodiment, stops that are non-adjustable in the axial direction are provided at each axial end of the shaft. These stops define the length of the assembly region on the shaft in which the at least one link element mounted to be rotatable and the further components are arranged.

In one embodiment, at least one of the axial bearings abuts axially against one of the stops, against a spacer sleeve, and/or against the pretensioning element. The axial bearing then enables the link element to rotate relative to these components.

In particular, one of the axial bearings can be arranged with one side on the stop and with the other side on a spacer sleeve, on the preloading element, or directly on the link element mounted to be rotatable.

In particular, one of the axial bearings can be arranged with one side on the link element mounted to be rotatable and with the other side on a further link element mounted to be rotatable, on a spacer sleeve, or on the pretensioning element.

In particular, one of the axial bearings can be arranged with one side on a spacer sleeve, with the other side on a further spacer sleeve or on the pretensioning element.

The preloading element can be arranged with one side on the stop and with the other side on a spacer sleeve, on one of the axial bearings, or on the link element mounted to be rotatable.

In particular, the pretensioning element can be arranged with one side on the link element mounted to be rotatable and with the other side on a further link element mounted to be rotatable, on a spacer sleeve, or on one of the axial bearings. In one embodiment, the pretensioning element can be arranged between a pair of link elements mounted to be rotatable which then form a jointly rotating pair.

In particular, the pretensioning element can be arranged with one side on a spacer sleeve, with the other side on a further spacer sleeve, or on one of the axial bearings.

At least one of the stops can be formed by an axially outer link element affixed to be rigid or rotatable in the axial end region on the shaft, a shoulder in the shaft, or a fixation element. If the axially outer link element forms the stop, separately provided fixation elements can be dispensed with, which simplifies the manufacture and assembly of the joint bearing.

The shoulder can be provided by a change in diameter of the shaft produced by way of a turning process.

The axially outer link element can be attached to the face side of the shaft, for example, by screwing. The outer link element can be rotatable relative to the shaft, but alternatively and preferably it is rigidly connected to the shaft. The fixation of the outer link element to the shaft can be effected in particular by a fastening element, for example, in the form of a screw, a nut, a tensioning element with a bayonet lock, or another fastening element, in particular equipped with a thread.

The fixation element can be, in particular, slid or screwed onto the shaft up to a defined position and can thus be attached at a predetermined position on the shaft. The fixation element can be a nut or a retaining collar.

Consequently, an axial distance is specified by the non-adjustable stops, in which the axial bearings and the at least one link element mounted to be rotatable, the resiliently compressible pretensioning element, as well as optional spacer sleeves and possibly further components are provided, where their axial extension and the resilience of the resiliently compressible pretensioning element define the pretensioning force of the bearings and the positioning of the link element mounted to be rotatable.

In particular, the pretension can be provided with only one resiliently compressible pretensioning element. In a further embodiment, however, several resiliently compressible pretensioning elements can also be provided.

In one embodiment, the pretensioning element is a helical compression spring, a disk spring, a finger spring, an elastic O-ring, in particular a sealing ring, an elastomer ring, a locking plate or a spring washer. These components extend in particular in the circumferential direction around the shaft and thereby enable a substantially uniform pretensioning force over the entire circumferential direction, a uniform bearing pretensioning force, and precise positioning. In addition, a combination of several of these identical or different components can be provided as a pretensioning element in order to provide the desired resilient properties. The component for the pretensioning element can also be in several parts, for example, consist of two halves.

In one embodiment, at least one spacer sleeve is arranged axially adjacent to the pretensioning element on the shaft.

For example, maintaining a distance between the pretensioning element and the axial bearing can then be made possible.

Several link elements mounted to be rotatable are advantageously provided on the shaft. Several link elements mounted to be rotatable can be provided for joint rotation. They link elements mounted to be jointly rotatable, together with a spacer sleeve, can form an integrally rotating unit within which no axial bearings need to be provided. In particular, the several link elements mounted to be rotatable can each be provided in jointly rotating pairs of link elements.

The shaft can have a shoulder at at least one axial end against which an outer link element is affixed so that the outer link element is connected to the shaft in a predefined, non-adjustable axial position. The shoulder forms a stop for the fixation of the outer link element. The fixation is effected in particular by screwing the link element to the shaft. The outer link element can rotate in particular only together with the shaft, i.e. is rigidly connected thereto.

The shaft can either be formed integrally or in several parts. In particular, the shaft can comprise an inner shaft, in particular in the form of a cylindrical solid shaft, and a hollow shaft slid onto the inner shaft, where the aforementioned shoulder is formed by the face side of the hollow shaft.

In particular, a shoulder against the inner shaft can be provided by each of the respective face sides of the hollow shaft. The distance between the outer link elements is therefore determined by the length of the hollow shaft. The link elements mounted to be rotatable relative to the outer hollow shaft can be arranged on the hollow shaft within this distance. The outer link elements are advantageously pressed firmly against the face side of the hollow shaft by a fastening element.

The joint bearing is advantageously symmetrical in the axial direction. In particular, the link elements mounted to be rotatable are arranged symmetrically in pairs with respect to a plane of symmetry arranged centrally in the axial direction.

In an advantageous embodiment, the shaft has a uniform diameter between two axially outer link elements. This enables the at least one inner link element mounted to be rotatable and the resiliently compressible pretensioning element to be able to be slid onto the shaft and positioned in dependence of their axial lengths. Furthermore, this enables a constant axial pretensioning force along all elements between the axially outer link elements.

In particular, one, two, three or more pairs of link elements mounted to be rotatable are arranged on the shaft, where all rotatable link elements are acted upon by the same axial pretensioning force that is predetermined by the resilient pretensioning element.

A respective axial bearing is advantageously provided between the link elements, which are mounted to each be rotatable independently of one another, in order to enable a simple rotation of these link elements relative to one another.

The following components are arranged on the shaft in an advantageous order, depending on the application, between the non-adjustable stops: at least two axial bearings, at least one link element mounted to be rotatable, optionally at least one spacer sleeve, and at least one resiliently compressible pretensioning element. Material pairings in any combination, in particular made of the following materials, can be employed among these elements: steel, sintered bronze, plastic material and aluminum. The components are advantageously arranged in a symmetrical manner with respect to the axial direction.

One or more pretensioning elements, optionally in combination with one or more spacer sleeves, can be arranged on the shaft. In addition, a plurality of joint bearing points with link elements mounted to be rotatable can be provided on the shaft. A respective axial bearing is advantageously provided between the link elements mounted to be rotatable, except between the axially innermost link elements. They then move together as a jointly rotating element.

With the embodiment according to the invention, all of the joint bearing points are each equally pretensioned and aligned axially.

In other embodiments of the invention, shoulders or axial stops can also be provided on the shaft so that different axial pretensioning forces and separate positioning in sections or alignment of at least one or advantageously several link elements mounted to be rotatable is possible in different axial regions of the shaft.

The pretensioning elements can be symmetrical or only one pretensioning element can be mounted to the shaft on one side.

The spacer sleeves can be made of suitable plastic materials or metals with good sliding properties, such as bronze, so that they additionally take on the function of the axial bearing in the form of a thrust washer.

Radial bearings are advantageously provided between the shaft and the link elements mounted to be rotatable. In particular, radial bearings are provided within the link elements mounted to be rotatable.

The shaft is configured in particular as a simple shaft without shoulders, and the axially outer link elements or alternatively provided fixation elements are attached to the face side of the shaft.

The joint bearing according to the invention is compact and robust, has a low weight, and is self-centering, where forces are ideally absorbed and dissipated without adjustment of the pretensioning force or the axial position. In addition, manufacturing tolerances are compensated for, and operationally reliable mounting with little play is achieved. In addition, the joint bearing has a high degree of rigidity.

In particular, compression of the pretensioning element is intended in the axial direction between 0.1 mm (millimeters) and 2 mm, advantageously between 0.2 mm and 1.3 mm. A pre-tensioning force of between 30 N (Newtons) and 800 N is generated, advantageously from 80 N to 420 N. In one embodiment, a pre-tensioning force of approximately 180 N to 220 N is generated. In a further embodiment, a pre-tensioning force of approximately 30 N to 50 N is generated. Such pretensioning force can be achieved, for example, by using a finger spring washer as a pretensioning element.

When using disk springs in the pre-tensioning element, they can be arranged in series, i.e. uniformly having the same orientation, so that twice the axial pre-tensioning force is obtained with the same compression, or in parallel, i.e. in an alternating arrangement, so that the axial pre-tensioning force is halved with the same compression distance. In particular, the disk springs have a modulus of resilience of 500 N/mm to 2500 N/mm, advantageously from 1500 N/mm to 2000 N/mm, with axial compression.

The invention further provides a robot with a first four-bar linkage for driving at least one robotic arm, in particular a pivot arm, support arm, or gripping arm, where the first four-bar linkage comprises a crank, a link, and a rocker arm, the crank being connected to the link and the link to the rocker arm each by way of a joint bearing, and where at least one of these joint bearings is configured as described above.

The use of the joint bearing in a robot with a drive by way of a gear in the form of a four-bar linkage is advantageous for the reason that the four-bar linkage provides a plurality of link elements to form the crank, the link and the rocker arm, but where their mounting is typically not exposed to high axial forces, but mainly radial forces.

Advantageously, the four-bar linkage element in the kinematic row being the first one, in particular the crank, and/or the four-bar linkage element being the last one in the kinematic row of the same four-bar linkage and/or a subsequent four-bar linkage, i.e. a rocker arm, is attached in a manner non-displaceable in the axial direction, in particular rigidly, in particular on the base or on a robotic arm. The crank can be flanged directly onto a gear or motor, for example, in the base. The rocker arm, however, can be mounted in one of the robotic arms or robotic joints in an axially non-displaceable manner. The axial position of the inner link elements of the four-bar linkage or four-bar linkages is therefore defined by the kinematically first and last four-bar linkage elements The four-bar linkage comprises four-bar linkage elements in the form of a crank, a link and a rocker arm that are connected pivot joint-like to one another in this order. A four-bar linkage element can be formed by one, two, three, four or more link elements of the joint bearing which are advantageously arranged symmetrically in the axial direction in the joint bearing. The link elements, which together form a four-bar linkage element, extend in particular substantially in parallel.

In addition to the first four-bar linkage, the robot advantageously comprises a second four-bar linkage, the crank of which corresponds to the rocker arm of the first four-bar linkage, where the connection between the link of the first four-bar linkage, the crank of the second four-bar linkage, and the link of the second four-bar linkage are configured in the form of the joint bearing according to the invention. The use of the joint bearing according to the invention in such four-bar linkages connected in series is particularly advantageous since a plurality of components rotatable relative to one another are there arranged on only one shaft.

In one embodiment, the crank, the link, or the rocker arm of the first or second four-bar linkage is formed by at least one link element of the joint bearing mounted to be rotatable. The crank, the link, or the rocker arm of the first or the second four-bar linkage are each advantageously formed by a pair of link elements of the joint bearing which are rotated jointly.

A method according to the invention for assembling a joint bearing for a robot comprises providing a shaft, sliding axial bearings, at least one link element mounted to be rotatable and a resiliently compressible pretensioning element onto the shaft, and attaching an axial stop on the shaft so that the axial region, in which the axial bearings, the link element mounted to be rotatable, and the resiliently compressible pretensioning element are provided to be freely displaceable, is limited to a predetermined non-adjustable length.

This method enables the quick and yet operationally reliable assembly of the joint bearing, even if a plurality of link elements that are mounted to be rotatable relative to one another are provided on the shaft.

The method according to the invention allows the assembly time to be reduced. During assembly, all the components are slid onto the shaft in a predetermined order and attached between stops, at least one of which is provided by a fixation element or by an axially outer link element. Since the position of the stop is defined, no further alignment is necessary and both the position of the components as well as the axial pretensioning force are ideally adjusted.

BRIEF DESCRIPTION OF THE DRAWINGS

The invention shall be further described using exemplary embodiments which are illustrated below in the following figures.

DETAILED DESCRIPTION

Figure 1:
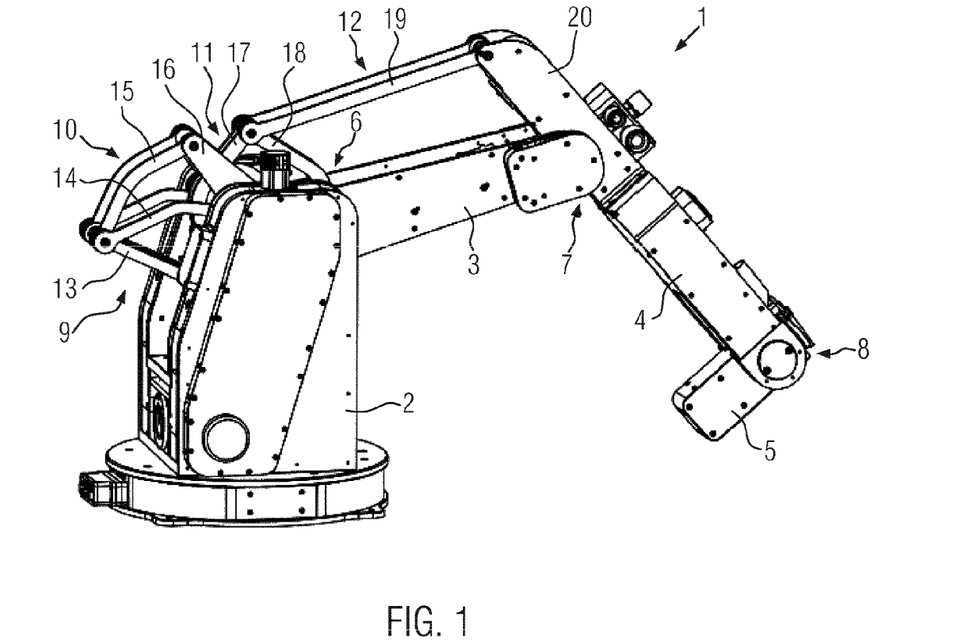
FIG. 1 shows a perspective view of a robot in which at least one embodiment of the joint bearing according to the invention is used.

Robot 1 shown in FIG. 1 comprises a base 2 rotatable about the vertical axis, a pivot arm 3, a support arm 4, and an articulated arm 5. Aforementioned arms 3, 4, 5 are arranged in series according to serial kinematics.

Robot 1 shown is a 5-axis robot or a 6-axis robot. The vertical axis for the rotation of base 2 represents a first axis of robot 1. A first joint 6 defining a second axis of robot 1 is provided between base 2 and pivot arm 3. A second joint 7 defining a third axis of robot 1 is provided between pivot arm 3 and support arm 4. A third joint 8 defining a fourth axis of robot 1 is provided between support arm 4 and articulated arm 5. Support arm 4 can be rotatable in itself with a further joint, so that a further axis of robot 1 is provided there. A gripper (not shown) or a different working element can be rotated relative to articulated arm 5 about a fifth or sixth axis of robot 1.

Joints 6, 7 enable pivot arm 3 and support arm 4 to pivot about the respective substantially horizontal second and third axes of the robot. The drive motor of third joint 8 is provided directly or by way of a gear thereon, as in the case with purely serial kinematics. The gear can be a drive belt.

The drive motions for first joint 6 and second joint 7 are each transmitted via four-bar linkages 9, 10, 11 and 12.

First four-bar linkage 9 and second four-bar linkage 10 are arranged in series for transmitting a drive motion to pivot arm 3 so that the latter can be pivoted relative to base 2. First four-bar linkage 9 comprises a first crank that is hidden in FIG. 1 in base 2 and that can be pivoted by way of a first drive motor and is articulated to link 13 and accordingly drives link 13 of first four-bar linkage 9. Link 13 is articulated to rocker arm 14 of first four-bar linkage 9 and drives it. Rocker arm 14 simultaneously forms the crank of second four-bar linkage 10 and is articulated to link 15 of second four-bar linkage 10 and drives it. Rocker arm 16 of second four-bar linkage 10 is rigidly connected to pivot arm 3 and co-rotates during its pivot motion. Rocker arm 16 and pivot arm 3 can be formed integrally. In particular, rocker arm 16 and pivot arm 3 form a rocker with respect to joint 6. The crank of first four-bar linkage 9 can be flange-mounted on a motor or gear in base 2 in a manner non-displaceable in the axial direction. The gear can also be a drive belt or the like. Rocker arm 14 can likewise be mounted in base 2 in a manner non-displaceable in the axial direction. Finally, the mounting of rocker arm 16 in joint 6 can also be non-displaceable in the axial direction.

The drive motion for pivoting support arm 4 relative to pivot arm 3 is transmitted to support arm 4 by a second drive motor in base 2 through third four-bar linkage 11 and fourth four-bar linkage 12. The second drive motor pivots a crank of third four-bar linkage 11, which is arranged inside base 2 and therefore cannot be seen in FIG. 1 and which is articulated to link 17 of third four-bar linkage 11 and drives it. Link 17 is articulated to rocker arm 18 of third four-bar linkage 11 and drives it. Rocker arm 18 is at the same time the crank of fourth four-bar linkage 12 which is articulated to link 19 of fourth four-bar linkage and drives it. Rocker arm 20 and support arm 4 are rigidly connected in the form of a rocker with respect to second joint 7. Rocker arm 20 of fourth four-bar linkage 12 is in particular formed integrally with support arm 4. The crank of third four-bar linkage 11 can be flange-mounted on a motor or gear in base 2 in a manner non-displaceable in the axial direction. The gear can also be a drive belt or the like. Rocker arm 18 can be mounted in pivot arm 3 in a manner non-displaceable in the axial direction. Finally, the mounting of rocker arm 20 in joint 7 can also be non-displaceable in the axial direction.

The joint bearings between the four-bar linkage elements in the form of cranks, rocker arms, and links of four-bar linkages 9, 10, 11, 12 described above can be implemented in part or entirely by joint bearings according to the invention.

Figure 2:
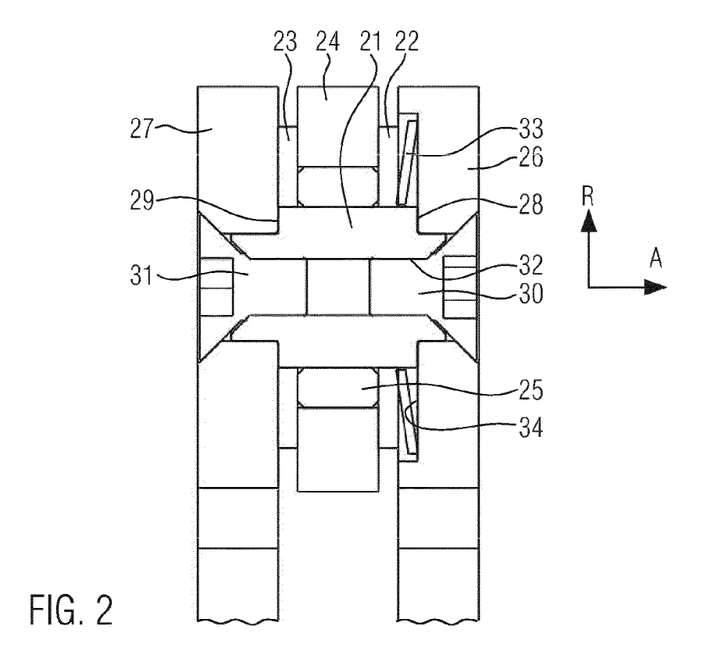
FIG. 2 shows a sectional view of a first embodiment of a joint bearing according to the invention.

In one embodiment of the invention, a joint bearing like in FIG. 2 is used for a connection between four-joint linkage elements of robot 1.

In FIG. 2, a shaft 21 extending in axial direction A is provided on which a link element 24 to be rotatable is arranged between axial bearings 22, 23 on a radial bearing 25. Axially outer link elements 26, 27 are rigidly connected to the respective axial face sides of shaft 21 and are in particular arranged on a shoulder 28, 29 at the axial end of shaft 21. Axially outer link elements 26, 27 are each pressed onto the axial face surface of shoulder 28, 29 by a screw 30, 31, and are thereby precisely affixed in the axial direction. Screws 30, 31 are screwed into a central internal thread 32 in shaft 21. In particular, axially outer link elements 26, 27 can have a chamfer or a recess for receiving screws 30, 31 in a flush manner. The inner sides of axially outer link elements 26, 27 form the respective axial stops for the components arranged on the shaft.

Link element 24 mounted to be rotatable and axially outer link elements 26, 27 each extend substantially in a radial direction R away from shaft 21.

In order to apply an axial pretensioning force for axial bearings 22, 23 and to compensate for manufacturing tolerances in axial direction A, a resiliently compressible pretensioning element 33 in the form of a disk spring or finger spring washer is provided, which is provided between axially outer link element 26 and axial bearing 22. In particular, pretensioning element 33 is provided in a recessed region 34 of axially outer link element 26. Pretensioning element 33 and the adjoining bearing half of axial bearing 22 or axial bearing 22 itself, if it is formed by a thrust washer, can optionally be secured against rotating with respect to link element 26 by use of a positive fit or a lock, for example, in the form of a pin. This can ensure that the motion only takes place at the desired location, for example, between axial bearing 22 and link element 24.

An embodiment of a method according to the invention for assembling the joint bearing according to FIG. 2 can be carried out as follows: Shaft 21 is first inserted up to shoulder 28 into the opening in axially outer link element 26 and axially outer link element 26 is attached rigidly to the shaft using screw 30. Pretensioning element 33, axial bearing 22, link element 24 with radial bearing 25 and axial bearing 23 are then be slid onto shaft 21. Axially outer link element 27 is finally slid onto shaft 21 up to shoulder 29 and is rigidly attached to shaft 21 using screw 31. Determined by shoulders 28, 29, there is a defined spacing that is between the stops in the form of axially outer link elements 26, 27 and that therefore determines the axial pretensioning force on shaft 21 depending on the axial length of the aforementioned components on shaft 21 and the resilience of pretensioning element 33.

Figure 3:
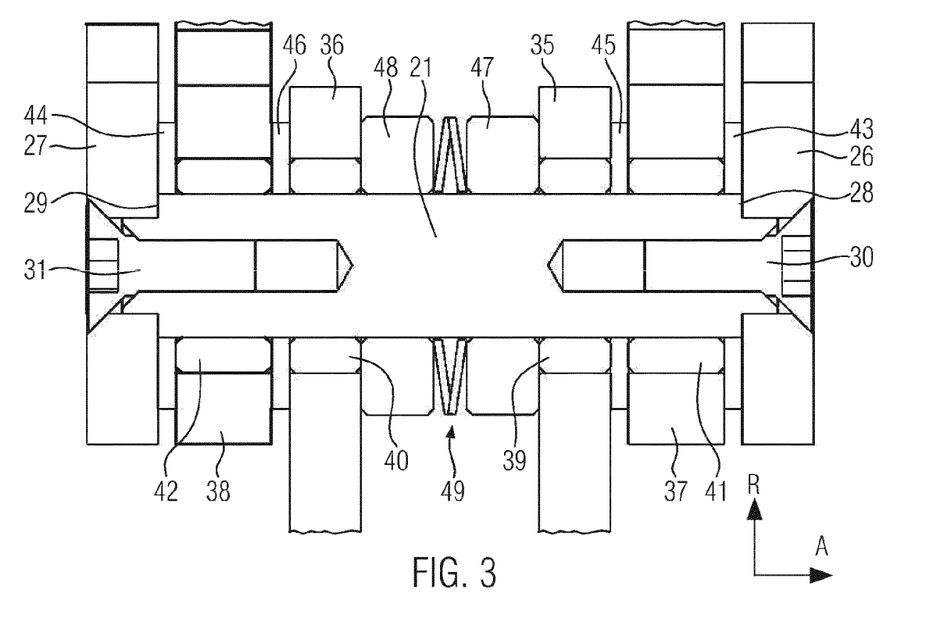
FIG. 3 shows a sectional view of a second embodiment of a joint bearing according to the invention.

FIG. 3 shows a second embodiment of a joint bearing according to the invention. In this embodiment, two pairs of link elements 35, 36, 37, 38 are arranged rotatable on shaft 21 by way of radial bearings 39, 40, 41, 42. It is provided that two of link elements 35, 36, 37, 38 mounted to be rotatable form a four-bar linkage element, for example, a crank, a link, or a rocker arm. In particular, the pair of link elements 35, 36 forms a four-bar linkage element and the pair of link elements 37, 38 form a further four-bar linkage element. Furthermore, axially outer link elements 26, 27 are again firmly attached to shaft 21 by screwing. The pair of axially outer link elements 26, 27 likewise form a four-bar linkage element.

An axial bearing 43, 44 is arranged between axially outer link element 26, 27 rigidly connected to the shaft and axially outer link element 37, 38 mounted to be rotatable. Furthermore, an axial bearing 45, 46 is provided between axially outer link element 37, 38 mounted to be rotatable and radially inner link element 35, 36 mounted to be rotatable. A spacer sleeve 47, 48 is provided axially inside axially inner link element 35, 36 mounted to be rotatable. A resiliently compressible pretensioning element 49 is provided centrally between spacer sleeves 47, 48. Pretensioning element 49 consists in particular of two oppositely oriented disk springs.

The axial length of the respective components on shaft 21 as well as the axial length of shaft 21 between the stops in the form of the axially outer link elements 26, 27, which are determined in their positions by shoulders 28, 29, therefore determine the degree of compression of pretensioning element 49 and thereby, in dependency of its resiliency, the axial pretensioning force of axial bearings 43, 44, 45, 46.

Radial bearings 39, 40, 41, 42 can be configured in particular as sliding bearings. Axial bearings 43, 44, 45, 46 can be configured in particular as thrust washers.

Pretensioning element 49, spacer sleeves 47, 48, and axially inner link elements 35, 36 form a block of co-rotating components.

The joint bearing according to FIG. 3 can be employed, for example, in the joint bearing of robot 1 from FIG. 1 between link 17, rocker arm 18, and link 19. For example, link 17 is formed by axially inner link elements 35, 36 mounted to be rotatable, rocker arm 18 by link elements 37, 38 mounted to be rotatable, and link 19 by axially outer link elements 26, 27.

Figure 4:
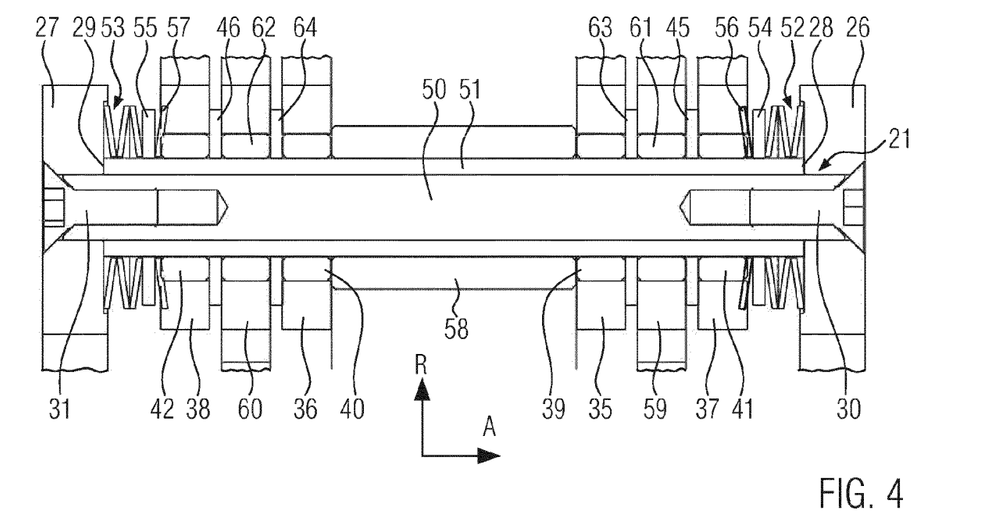
FIG. 4 shows a sectional view of a third embodiment of a joint bearing according to the invention.

FIG. 4 shows a third embodiment of a joint bearing according to the invention. In this embodiment, shaft 21 is formed by an inner shaft 50 and a hollow shaft 51 slid onto inner shaft 50. Since hollow shaft 51 is configured to be shorter than inner shaft 50, shoulders 28, 29 are formed by the face sides of hollow shaft 51. Shoulders 28, 29 form an abutment surface for axially outer link elements 26, 27. In this embodiment, pretensioning elements 52, 53 are arranged directly between axially outer link elements 26, 27, which are rigidly connected to shaft 21, and an axial bearing 54, 55. A further pretensioning element 56, 57 can be arranged axially within axial bearing 54, 55. The pretensioning elements are formed by three disk springs arranged in axially alternating orientations. Pretensioning elements 56, 57 are each formed by a single disk spring. However, different combinations are possible depending on the application; in particular, the number of disk springs for every pretensioning element can be varied. Furthermore, either pretensioning elements 52, 53 or pretensioning elements 56, 57 can be omitted. If thrust washers are used as axial bearings 54, 55, additional friction disks, which enlarge the friction surface of pretensioning elements 52, 53 and possibly 56, 57, can be used to relieve the friction point on the thrust washers. They can be fixedly connected to the pretensioning elements.

Provided on shaft 21 axially inside axial bearing 54, 55 or pretensioning element 56, 57, respectively, is an axially outer link element 37, 38 which is mounted to be rotatable by way of a radial bearing 41, 42. Furthermore, an axially inner link element 35, 36 mounted to be rotatable is provided on shaft 21, namely directly adjacent to a centrally arranged spacer sleeve 58. In this embodiment, a center link element 59, 60 mounted to be rotatable is additionally mounted by way of radial bearings 61, 62 on shaft 21. An axial bearing 45, 46 is arranged between axially outer link element 37, 38 mounted to be rotatable and central link element 59, 60 mounted to be rotatable. An axial bearing 63, 64 is arranged between axially inner link element 35, 36 mounted to be rotatable and central link element 59, 60 mounted to be rotatable.

The method for assembling the joint bearing shown in FIG. 4 can be carried out as follows: Inner shaft 50 is first attached to axially outer link element 26 by way of screw 30. Hollow shaft 51 is then mounted onto inner shaft 50 and slid up to the stop on axially outer link element 26. The components to be arranged on hollow shaft 51 are then mounted consecutively on hollow shaft 51 and axially outer link element 27 is finally attached to inner shaft 50 by way of screw 31 so that it is pressed against the face side of hollow shaft 51. The axial pretensioning force is thus determined in dependence of the length of hollow shaft 51 as well as the components arranged thereon and the resilience of pretensioning elements 52, 53, 56, 57.

Pretensioning elements 52, 53, 56, 57 are configured as disk springs or packages of disk springs. Axial bearing 54, 55 between preloading elements 52, 56; 53, 57 can be in particular a thrust washer. Spacer sleeve 58 and axially inner link elements 35, 36 can be co-rotated on shaft 21 as an integral unit.

Figure 5:
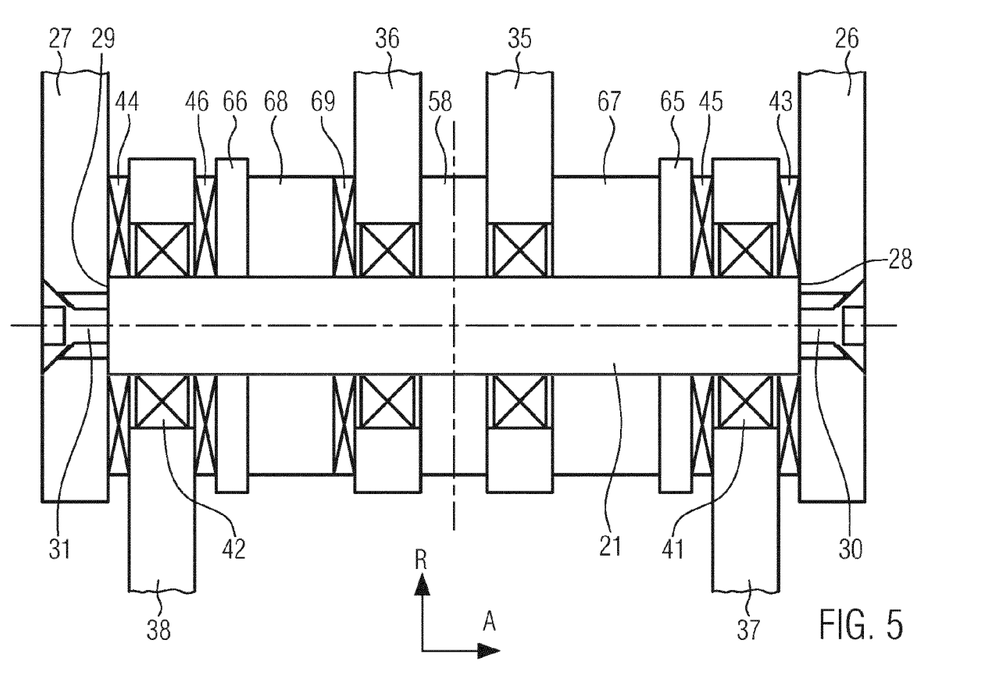
FIG. 5 shows a sectional view of a fourth embodiment of a joint bearing according to the invention.

The joint bearing according to FIG. 4 can be used, for example, between link 13, rocker arm 14, and link 15 in FIG. 1. Link elements 35, 36, 37, 38 there form link 13, link elements 59, 60 form link 15, and axially outer link elements 26, 27 form rocker arm 14. The four-bar linkage element in the form of link 13 there is therefore formed by four link elements and the four-bar linkage elements in the form of rocker arm 14 and link 15 by two link elements FIG. 5 shows a further embodiment of a joint bearing according to the invention. Resilient pretensioning elements 65, 66 are there each arranged axially inside an axial bearing 45, 46 which abuts against radially outer link element 37, 38 mounted to be rotatable. In this embodiment or in other embodiments, pretensioning element 65, 66 can be configured as an elastomer ring. A spacer sleeve 67, 68 is arranged axially inside pretensioning element 65, 66. An axially inner link element 35, 36 mounted to be rotatable is provided axially inside spacer sleeve 67, 68. Link elements 35, 36 can rotate en bloc with an inner spacer sleeve 58.

It is optionally possible for an axial bearing 69 to be provided between one of spacer sleeves 68 and adjoining link element 36. In this and other embodiments, the axial bearings and/or radial bearings can be configured as rolling bearings.

As can be seen from the preceding embodiment, the joint bearing according to the invention enables a compact configuration, simple assembly of the joint bearings without complex alignment of the individual link elements, simple adjustment of the bearing pretension, self-alignment of the components, in particular of the link elements mounted to be rotatable on the shaft, great rigidity of the system in the radial direction and a sufficient rigidity in the axial direction. Furthermore, the joint bearing can be configured to be maintenance-free, and a constant bearing pretension is maintained over the entire service life.

At least very small bearing play in the radial direction and no bearing play in the axial direction is obtained with the joint bearing according to the invention. If the radial play is also to be prevented, for example, a skew rolling bearing can be provided for mounting the link element mounted to be rotatable.

In the symmetrical and substantially symmetrical embodiments according to FIGS. 2 to 5, the link elements can be aligned symmetrically on the shaft by balancing forces.

The invention claimed is:

1. A robot, comprising:
a first four-bar linkage (9, 11) for driving at least one robotic arm (3, 4), wherein said first four-bar linkage (9, 11) comprises a plurality of link elements which form a crank, a coupler link (13, 17) and a rocker arm (14, 18), said crank being connected to said coupler link (13, 17) and said coupler link (13, 17) being connected to said rocker arm (14, 18) each via a joint bearing, wherein at least one of said joint bearings comprises a shaft (21);
at least one link element (24, 35, 36, 37, 38, 59, 60) of said plurality of link elements rotatably mounted on said shaft (21) between two axial bearings (22, 23, 43, 44, 45, 46, 54, 55, 63, 64, 69); and
a resiliently compressible pretensioning element (33, 49, 52, 53, 56, 57, 65, 66) which applies an axial pretensioning force to said axial bearings.

2. The robot according to claim 1, further comprising a stop at each axial end of said shaft (21), respectively, wherein said stops are non-adjustable in an axial direction.

3. The robot according to claim 2, wherein at least one of said axial bearings (22, 23, 43, 44, 45, 46, 54, 55, 63, 64, 69) abuts axially against one of said stops, against a spacer sleeve (47, 48, 58, 67, 68) or against said resiliently compressible pretensioning element (33, 49, 52, 53, 56, 57, 65, 66).

4. The robot according to claim 2, wherein at least one of said stops is formed by an axially outer link element (26, 27) attached to said shaft (21) or wherein at least one of said stops is formed by a shoulder of said shaft (21).

5. The robot according to claim 1, wherein said resiliently compressible pretensioning element (33, 49, 52, 53, 56, 57, 65, 66) is one of a helical compression spring, a disk spring, a finger spring washer, an elastic O-ring, a sealing ring, an elastomer ring, a locking plate, or a spring washer.

6. The robot according to claim 1, further comprising at least one spacer sleeve (47, 48, 58, 67, 68) arranged axially adjacent to said resiliently compressible pretensioning element (33, 49, 52, 53, 56, 57, 65, 66) on said shaft (21).

7. The robot according to claim 1, wherein individual ones of said plurality of link elements (35, 36, 37, 38, 59, 60) inclusive of said at least one link element, are rotatably mounted on said shaft (21).

8. The robot according to claim 1, wherein said shaft (21) comprises a shoulder (28, 29) at at least one axial end of said shaft against which an outer link element (26, 27) of said plurality of link elements is affixed so that said outer link element (26, 27) is connected to said shaft (21) in a predefined, non-adjustable axial position.

9. The robot according to claim 8, wherein said shaft (21) comprises an inner shaft (50) and a hollow shaft (51) disposed about said inner shaft (50), wherein said shoulder (28, 29) is formed by a side face of said hollow shaft (51).

10. The robot according to claim 1, wherein said at least one joint bearing is symmetrical in an axial direction.

11. A robot according to claim 1, wherein said shaft (21) has a uniform diameter between two axially outer link elements (26, 27) of said plurality of link elements.

12. The robot according to claim 1, further comprising a second four-bar linkage (10, 12) comprising a second plurality of link elements which form a crank, a coupler link, and a rocker arm of said second four-bar linkage, wherein said rocker arm (14, 18) of said first four-bar linkage (9, 11) corresponds to the crank of the second four-bar linkage, and wherein a connection between said coupler link (13, 17) of said first four-bar linkage (9, 11), said crank of said second four-bar linkage (10, 12), and said coupler link (15, 19) of said second four-bar linkage (10, 12) is configured as a joint bearing comprising:
the shaft (21);
at least one link element of said second plurality of link elements (24, 35, 36, 37, 38, 59, 60) rotatably mounted on said shaft (21) between two axial bearings (22, 23, 43, 44, 45, 46, 54, 55, 63, 64, 69); and
[[a]]the resiliently compressible pretensioning element (33, 49, 52, 53, 56, 57, 65, 66) which applies an axial pretensioning force to said axial bearings.

13. A robot according to claim 12, wherein said crank, link (13, 15, 17, 19) or rocker arm (14, 16, 18, 20) of said first or second four-bar linkage (9, 10, 11, 12) is formed by the at least one link element (24, 35, 36, 37, 38, 59, 60) of said at least one of said joint bearings, wherein the at least one link element is rotatably mounted.

* * * * *